(12) United States Patent
Tazzia

(10) Patent No.: US 6,538,094 B2
(45) Date of Patent: Mar. 25, 2003

(54) PROCESS FOR SYNTHESIS OF ALLOPHANATE COMPOUNDS AND COMPOSITIONS INCLUDING THE PRODUCT THEREOF

(75) Inventor: Charles L. Tazzia, Detroit, MI (US)

(73) Assignee: BASF Corporation, Southfield, MI (US)

( * ) Notice: Subject to any disclaimer, the term of this patent is extended or adjusted under 35 U.S.C. 154(b) by 143 days.

(21) Appl. No.: 09/778,429

(22) Filed: Feb. 7, 2001

(65) Prior Publication Data

US 2001/0007012 A1 Jul. 5, 2001

Related U.S. Application Data

(62) Division of application No. 09/217,918, filed on Dec. 21, 1998, now Pat. No. 6,228,472.

(51) Int. Cl.$^7$ ............................................... C08G 18/18
(52) U.S. Cl. ........................... 528/53; 560/25; 560/115; 560/158; 252/182.2
(58) Field of Search ............................. 528/53; 560/25, 560/115, 158; 252/182.2

(56) References Cited

U.S. PATENT DOCUMENTS

| | | | |
|---|---|---|---|
| 4,177,342 A | 12/1979 | Bock et al. | 528/45 |
| 4,595,445 A | 6/1986 | Hombach et al. | 156/307.3 |
| 4,738,991 A | 4/1988 | Narayan | 521/124 |
| 4,847,346 A | 7/1989 | Vorwerk et al. | 528/45 |
| 4,976,837 A | 12/1990 | Hughes et al. | 204/181.7 |
| 5,057,559 A | 10/1991 | Parr et al. | 523/414 |
| 5,100,996 A | 3/1992 | Paar | 528/45 |
| 5,114,552 A | 5/1992 | McCollum et al. | 204/181.7 |
| 5,135,970 A | 8/1992 | Hönel et al. | 523/414 |
| 5,319,054 A | 6/1994 | Slack | 528/48 |
| 5,380,792 A | 1/1995 | Renk | 524/840 |
| 5,440,003 A | 8/1995 | Slack | 528/48 |
| 5,466,771 A | 11/1995 | Hicks et al. | 528/64 |
| 5,475,122 A | 12/1995 | Hoenel et al. | 556/89 |
| 5,506,327 A | 4/1996 | Yonek et al. | 528/45 |
| 5,574,122 A | 11/1996 | Yeske et al. | 528/28 |
| 5,576,411 A | 11/1996 | Yeske et al. | 528/70 |
| 5,610,260 A | 3/1997 | Schmalstieg et al. | 528/49 |
| 5,648,445 A | 7/1997 | Slack et al. | 528/49 |
| 5,686,042 A | 11/1997 | Slack et al. | 264/328.6 |
| 5,691,439 A | 11/1997 | Slack et al. | 528/49 |
| 5,783,652 A | 7/1998 | Rosthauser et al. | 528/48 |
| 5,977,247 A | 11/1999 | Schafheutle et al. | 524/591 |

FOREIGN PATENT DOCUMENTS

| | | | |
|---|---|---|---|
| CA | 2203229 | 4/1997 | C09D/175/04 |
| EP | 0 236 050 A1 | 2/1987 | C08G/18/08 |
| EP | 0 305 794 | 8/1988 | C08G/59/40 |
| EP | 0 362 653 A1 | 9/1989 | C08G/18/78 |
| EP | 0 362 654 A1 | 9/1989 | C07C/275/60 |

OTHER PUBLICATIONS

Copy of the International Search Report for PCT/EP 99/28077 filed Nov. 23, 1999, entitled Process for synthesis of allophanate compounds and compositions including the product thereof.

Japan Abstract, Patent Appln. No. 63160550, Jan. 16, 1990, entitled Catonic Electrodeposition Composition.

Japan Abstract, Patent Appln. No. 02 011 669, Jan. 16, 1990, entitled "the paint composition consists Of resins having cationic groups and active hydrogen which can be".

*Primary Examiner*—Rachel Gorr

(57) ABSTRACT

The invention provides a process for preparing an allophanate-containing compound in the presence of a metal catalyst and a tertiary amine. In a preferred process, the tertiary amine compound also has a hydroxyl group. The hydroxyl group can react with the isocyanate functionality. Also disclosed is a process in which an allophanate-containing compound is prepared with copper acetate monohydrate as a catalyst. The allophanate-containing compound is used as a curing agent in coating compositions, particularly electrocoat coating compositions. The coating compositions are used to coat articles.

16 Claims, No Drawings

PROCESS FOR SYNTHESIS OF ALLOPHANATE COMPOUNDS AND COMPOSITIONS INCLUDING THE PRODUCT THEREOF

This application is a divisional application of U.S. application Ser. No. 09/217,918, filed Dec. 21, 1998, now U.S. Pat. No. 6,228,472.

FIELD OF THE INVENTION

The invention concerns processes for preparing allophanate compounds and thermosetting coating compositions that have allophanate curing agents.

BACKGROUND OF THE INVENTION

Electrodeposition coating compositions and methods are widely used in industry today. One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anticorrosion effectiveness.

Electrocoat baths usually comprise an aqueous dispersion of a principal film-forming resin, such as an acrylic or epoxy resin, having ionic stabilization. For automotive or industrial applications for which hard electrocoat films are desired, the electrocoat compositions are formulated to be curable compositions. This is usually accomplished by including in the bath a crosslinking agent that can react with functional groups on the principal resin under appropriate conditions (such as with the application of heat) and thus cure the coating. During electrodeposition, coating material containing an ionically-charged resin having a relatively low molecular weight is deposited onto a conductive substrate by submerging the substrate in an electrocoat bath having dispersed therein the charged resin and then applying an electrical potential between the substrate and a pole of opposite charge, for example, a stainless steel electrode. The charged coating material migrates to and deposits on the conductive substrate. The coated substrate is then heated to cure the coating.

One curing mechanism utilizes a melamine formaldehyde resin curing agent in the electrodepositable coating composition to react with hydroxyl functional groups on the electrodeposited resin. This curing method provides good cure at relatively low temperatures (perhaps 130° C.), but the crosslink bonds contain undesirable ether linkages and the resulting coatings provide poor overall corrosion resistance as well as poor chip and cyclic corrosion resistance.

In order to address some of the problems with melamine cross-linked electrocoats, many commercial compositions employ polyisocyanate crosslinkers to react with hydroxyl or amine functional groups on the electrodeposited resin. This curing method provides desirable urethane or urea crosslink bonds, but it also entails several disadvantages. In order to prevent premature gelation of the electrodepositable coating compositions, the highly reactive isocyanate groups on the curing agent must be blocked. Blocked polyisocyanates, however, require high temperatures, typically 175° C. or more to unblock and begin the curing reaction. In the past, the isocyanate crosslinkers have been blocked with a compound such as an oxime or alcohol, which unblocks and volatilizes during cure, in order to provide the lowest temperatures for the unblocking and curing reactions. The volatile blocking agents released during cure can cause other deleterious effects on various coating properties, however, and increase organic emissions. There is thus a need for electrodepositable coating compositions that could provide desirable urethane or urea crosslink linkages but that avoid the problems that now accompany compositions having polyisocyanate curing agents blocked with volatilizing agents.

SUMMARY OF THE INVENTION

I have now invented a process for making an allophanate compound that includes reacting a urethane group-containing precursor with an isocyanate group-containing compound in the presence of a metal catalyst and a tertiary amine. The process of the invention offers an advantage of reduced time for the allophanate reaction, even for reduced levels of metal catalyst as compared to allophanate synthesis without the presence of a tertiary amine. The present invention further provides a novel allophanate compound produced according the method just described.

In another embodiment, the invention offers a method of producing a compound containing at least one allophanate group which employs copper acetate monohydrate as catalyst. While metal acetylacetonate catalysts have previously been used, copper acetate monohydrate offers advantages in improved reaction and reduced cost of manufacture.

The invention further provides a coating composition, in particular an electrocoat coating composition, that includes a compound prepared according to the processes of the invention, in which the compound has at least one allophanate group. Electrocoat coating compositions that include the allophanate-containing compound formed by the process of the invention have unexpectedly improved throwpower properties. Electrocoat coating compositions that include the present allophanate compound also have unexpectedly improved cure at lower temperatures compared to current blocked-isocyanate electrocoat compositions.

The present invention further furnishes a method of coating a conductive substrate. In the method of the invention, a conductive substrate is immersed in an electrodeposition coating composition comprising, in an aqueous medium, an ionic resin and a curing agent having at least one allophanate group; then, a potential of electric current is applied between an electrode and the conductive substrate (which is then an electrode of the opposite charge) to deposit a coating layer onto the conductive substrate. The deposited coating layer is cured by reaction between the ionic resin and the curing agent having at least one allophanate group.

DETAILED DESCRIPTION OF THE INVENTION

The allophanate compounds of the invention are formed by reacting an excess of equivalents of organic polyisocyanate with a mono- or polyhydric compound in the presence of a tertiary amine compound and a catalyst. The reaction is understood to involve formation of an initial urethane group which then, in the presence of the tertiary amine and the catalyst, further reacts with an isocyanate to form the allophanate group. In one embodiment of the invention, the tertiary amine compound includes one or more hydroxyl groups that may react with isocyanate to form a urethane group. The urethane group may then react with more isocyanate to form allophanate functionality.

The equivalents of hydroxyl of mono- or polyhydric compound employed may range from about 0.01 to about 0.95 equivalents of hydroxyl per equivalent of isocyanate. A more preferred range would be from about 0.3 to about 0.75 equivalents of hydroxyl per equivalent of isocyanate, and even more preferred is from about 0.4 to about 0.6 equivalents of hydroxyl per equivalent of isocyanate. In a preferred embodiment, the tertiary amine compound is an aminoalcohol. The aminoalcohol may be included in an amount of from about 0.01 to about 0.5 equivalents hydroxyl per equivalent of isocyanate. More preferably, the aminoalcohol is used in an amount of from about 0.01 to about 0.1 equivalents hydroxyl per equivalent isocyanate, and even more preferred is from about 0.01 to about 0.07 equivalents of hydroxyl per equivalent of isocyanate. Although reaction conditions may be varied, the reaction may continue for 3 to 10 hours at temperatures of perhaps about 50° C. to about 150° C. Progress of the reaction can be monitored by any of the usual methods, such as titration, infrared spectroscopy, or viscosity measurement. A catalyst deactivator may optionally be added to stop the allophanate formation at a point where the desired isocyanate content or viscosity has been obtained. Addition of a deactivator is also desirable for storage stability of the product with unreacted isocyanate content. Typically, the reaction may be allowed to continue to completion so that the product has substantially no residual isocyanate functionality.

Organic polyisocyanates that may be employed to prepare the allophanate containing compound include aromatic, aliphatic, and cycloaliphatic polyisocyanates and combinations thereof. Representative of useful polyisocyanates are diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate-cyclohexane-1,4-diisocyanate, any of the isomers of hexahydrotoluene diisocyanate, isophorone diisocyanate, any of the isomers of hydrogenated diphenylmethane diisocyanate, naphthalene-1,5-diisocyanate, 1-methoxyphenyl-2,4-diisocyanate, any of the isomers of diphenylmethane diisocyanate, including 2,2'-diphenylmethane diisocyanate, 2,4'-diphenylmethane diisocyanate, and 4,4'-diphenylmethane diisocyanate, isomers of biphenylene diisocyanate including 2,2'-, 2,4'-, and 4.4'-biphenylene diisocyanates, 3,3'-dimethoxy-4,4'-biphenyl diisocyanate and 3,3'-dimethyl-diphenylmethane-4,4'-diisocyanate; triisocyanates such as 4,4',4"-triphenylmethane triisocyanate and toluene 2,4,6-triisocyanate; and the tetraisocyanates such as 4,4'-dimethyldiphenylmethane-2,2',5,5'-tetraisocyanate; and polymeric polyisocyanates such as polymethylene polyphenylene polyisocyanate. Especially useful due to their availability and properties are the various isomers of toluene diisocyanate and diphenylmethane diisocyanate and combinations of those isomers. Modified and oligomeric isocyanates, including isocyanurates, biurets, uretdione, and carbodiimide modifications are also advantageously used to produce the allophanate crosslinker. In one preferred embodiment, the polyisocyanate used comprises LUPERNATE® MI, LUPERNATE® MM103, both available from BASF Corp., Mt. Olive, N.J., or combinations thereof.

The mono- and polyhydric compounds that may be reacted with the polyisocyanate may have an equivalent weight of about 30 to about 1000, can contain up to about 8 hydroxyl groups in the molecule, and can also be alkylene oxide adducts of lower molecular weight alcohols. Monohydric alcohols that may be employed include both aliphatic and aromatic alcohols. Suitable examples include, without limitation, methanol, ethanol, propanol, 2-propanol, n-butanol, 2-chloroethanol, pentanol, n-octanol, 2-ethylhexanol, isooctyl alcohol, nonanol, ethylene glycol monoalkyl ethers, propylene glycol monoalkyl ethers, diethylene glycol monoalkyl ethers and higher molecular weight analogs of polyethylene glycol monoalkyl ethers, dipropylene glycol monoalkyl ethers and higher molecular weight analogs of polypropylene glycol monoalkyl ethers, 3,5,5-trimethylhexanol, isodecyl alcohol, benzyl alcohol, phenol, cyclohexanol, 2,2,2-tricholoroethanol, and the like, alkylene oxide adducts thereof, and combinations of these. The alkylene oxide may be ethylene oxide, propylene oxide, butylene oxide, pentylene oxide, or combinations thereof.

Suitable polyhydric compounds include both aliphatic and aromatic compounds. Particular examples include, without limitation, ethylene glycol, diethylene glycol, and higher polyethylene glycol analogs like triethylene glycol; propylene glycol, dipropylene glycol, and higher polypropylene glycol analogs like tripropylene glycol; 1,4-butanediol, 1,3-butanediol, 1,6-hexanediol, 1,7-heptanediol, glycerine, 1,1,1-trimethylolpropane, 1,1,1-trimethylolethane, hexane-1,2,6-triol, pentaerythritol, sorbitol, 4,4'-isopropylidene diphenol, (bisphenol A), resorcinol, catechol, hydroquinone, alkylene oxide adducts thereof and combinations of these.

In a preferred embodiment, the process of the invention further utilizes a tertiary amine compound. The tertiary amine compound comprises at least one tertiary amine group, and may optionally comprise additional tertiary amine groups. In a preferred embodiment, the tertiary amine compound comprises one or more alcohol groups. Suitable examples of useful tertiary amine compounds include, without limitation, compounds having the structure $R^1N(R^2)R^3$, wherein $R^1$, $R^2$, and $R^3$ are independently alkyl or hydroxyalkyl, preferably of from 1 to about 8 carbon atoms; or compounds having the structure $R^1N(R^2)$—L—$N(R^4)R^3$, wherein $R^1$, $R^2$, and $R^3$ are as already defined, $R^4$ is alkyl or hydroxyalkyl, preferably of from 1 to about 8 carbon atoms, and L is an alkylene, arylene, or alkylarylene group, preferably having 1 to about 15 carbon atoms; or substituted piperidines. Particular examples of such compounds include, without limitation, dimethylethanolamine, 5-diethylamino-2-pentanol, 3-(diethylamino)-1,2-propanediol, 3-diethylamino-1-propanol, 3-(dibenzylamino)-1-propanol, 2-(dibutylamino)ethanol, 4-(dimethylamino)-1-methylpiperidine, 4-(dimethylamino) phenethyl alcohol, 3-dimethylamino-2-propanol, 2-(diisopropylamino)ethanol, 3-diisopropylamino-1,2-propanediol, triethanolamine, triethylamine, tributylamine, triisopropanolamine, triisodecylamine, triisobutylamine, N,N,N',N'-tetraethyl-1,3-propanediamine, N,N,N',N'-tetraethylethylenediamine, N,N,N',N'-tetramethyl-1,6-hexanediamine, and so on, as well as combinations of such compounds. When the allophanate compound is to be used as a curing agent in a cathodic electrocoat coating composition, it is preferred that the tertiary amine compound comprises at least one hydroxyl group so that the tertiary amine compound will react in the curing agent synthesis and thus minimize the presence of low molecular weight amine compounds in the electrocoat bath. When the allophanate compound is to be used as a curing agent in an anodic electrocoat composition, the tertiary amine compound may function as the salting amine in the electrocoat coating composition.

When the allophanate compound of the invention is used in an electrocoat composition, weight loss on curing can be further minimized by selecting a low molecular weight tertiary amino alcohol when preparing the allophanate compound.

Useful catalysts for the allophanate synthesis are preferably those transition metal compounds that are at least partially soluble in the tertiary amine compound and that are known to promote formation of allophanate linkages. Soluble zinc and copper compounds are preferred. Suitable examples of useful catalysts include, without limitation, metal carboxylates, alcoholates, oxides, phenolates and metal chelates. In one preferred embodiment, the catalyst is selected from acetylacetonates, including zinc, cobalt, nickel, ferric, copper, and aluminum acetylacetonates, and tin compounds, including dibutyltin dilaurate, dibutyltin oxide, stannous octoate, and dibutyltin diacetate. When combined with the tertiary amine compound, the catalyst may be included in an unexpectedly reduced level as compared to the amount need to form allophanate compounds without the presence of the tertiary amine compound. The reaction rate appears to be at least doubled as compared to allophanate formation under the same conditions but without the tertiary amine compound.

In addition to known catalysts, it has been discovered that copper acetate monohydrate is an effective catalyst for the allophanate formation reaction. The copper acetate monohydrate offers a cost advantage over the metal acetoacetonate catatysts. The copper acetate monohydrate also appears to be somewhat more effective in the reaction and can be used in lower amounts, based upon available copper (II) cation.

The catalyst is typically included in an amount of 0.0001 to 0.001 equivalents per equivalent of isocyanate. Generally, the catalyst may be dissolved in the tertiary amine before being added to the reaction mixture.

The allophanate formation reaction may be continued until all of the isocyanate groups have reacted. In this case, when there is no residual isocyanate functionality after the allophanate reaction, the allophanate compound may be used in the electrocoat coating composition without further modification. In a different embodiment, however, the allophanate synthesis is ended while isocyanate functionality still remains. The allophanate crosslinkers with residual isocyanate functionality may, optionally, be reacted in an additional reaction in which at least some of the residual isocyanate groups are reacted with a blocking agent and/or an isocyanate-reactive extender compound to produce a blocked isocyanate and/or higher functionality crosslinker. The allophanate reaction may be stopped with residual isocyanate functionality, for example, to control the viscosity of the allophanate-functional product. It is preferred to have a viscosity, measured at 50° C., of 500,000 cps or less, more preferably 100,000 cps or less. In one particularly preferred embodiment, the allophanate reaction is continued until an isocyanate equivalent weight is obtained that is from about 200 to about 1200, more preferably from about 250 to about 1000, and even more preferably from about 250 to about 400.

The reaction may effectively be stopped by reducing the temperature, but it is often preferable to add a catalyst deactivator at the desired point of the reaction. Examples of the catalyst deactivators that may optionally be employed at the end of the reaction to prevent further allophanate formation include, without limitation, aliphatic and aromatic acid chlorides such as acetyl chloride, benzoyl chloride, benzenesulfonyl chloride, oxalyl chloride, adipyl chloride, sebacyl chloride, carbonyl chloride, and combinations of such compounds. Inorganic acid deactivators such as perchloric acid and strong organic acids such as trifluoromethanesulfonic acid and trifluoroacetic acid may also be used. Another group of catalyst deactivators that may be used are chloroformates such as methyl chloroformate, ethyl chloroformate, isopropyl chloroformate, n-butyl chloroformate, sec-butyl chloroformate, and diethylene glycol bis chloroformate.

Optionally, the isocyanate-functional allophanate compound may used in an additional reaction in which the residual isocyanate groups are blocked and/or the compound is extended through reaction of the residual isocyanate groups. Suitable blocking agent are those compounds that will unblock under the curing conditions to regenerate the isocyanate group for reaction as a crosslinking site. Blocking agents suitable for crosslinkers for electrocoat coating compositions are known in the art and include, without limitation, oximes, lower alcohols, lactams, and phenol. Specific examples of such materials include, without limitation, ethylene glycol monobutyl ether, diethylene glycol monobutyl ether, methyl ethyl ketoxime, $\epsilon$-caprolactam, and phenol.

Alternatively or in addition to reaction with a blocking agent, the isocyanate-functional allophanate precursor compound may be reacted with an extender compound, which is an isocyanate reactive material that is not expected to unblock and regenerate the isocyanate functionality during the curing reactions. Preferably, the extender compound is a polyfunctional compound that has two or more functional groups selected from primary amine groups, secondary amine groups, and alcohol groups. The polyfunctional extender compounds act as extenders to link two or more molecules of the allophanate precursor, producing a crosslinker with more allophanate groups per molecule. Useful examples of extender compounds include aminoalcohols, polyfunctional amines, and polyols. Particular examples of such materials include, without limitation, trimethylolpropane, diethyl toluene diamine, trifunctional or difunctional polyoxyalkylene amines (available commercially under the tradename POLYAMINE® from BASF Corporation or under the tradename JEFFAMINE® from Huntsman), polyols such as those available under the tradenames PLURACOL® and PLURONIC® from BASF. The crosslinker preferably has no residual isocyanate functionality.

The crosslinker of the invention has at least about one allophanate group per molecule on average and preferably has a plurality of allophanate groups per molecule. The crosslinker preferably has up to about 16, more preferably up to about 12, and even more preferably up to about 8 allophanate groups per molecule on average. The crosslinker also has preferably more than about 1, more preferably at least about 2, and even more preferably at least about 3 allophanate groups per molecule, on average. The crosslinker of the invention preferably has from about 1 to about 16 allophanate groups on average per molecule, more preferably has from about 1 to about 12 allophanate groups on average per molecule, and even more preferably has from about 1 to about 8 allophanate groups on average per molecule. Typically, the crosslinker may have an equivalent weight of from about 200 to about 1200, based on combined equivalents of allophanate and blocked isocyanate groups (if present). The weight average molecular weight may vary widely. In a preferred embodiment, the crosslinker of the invention has a weight average molecular weight of from about 2000 to about 15,000, more preferably from about 4000 to about 12,000.

The electrocoat composition is an aqueous dispersion that includes at least a principal film-forming resin and the allophanate curing agent of the invention. A variety of such resins are known, including without limitation, acrylic, polyester, epoxy, and polybutadiene resins. Preferably, the principal resin is cathodic, i.e., it has basic groups and is salted with an acid. In a cathodic electrocoating process, the article to be coated is the cathode. Water-dispersible resins used in the cathodic electrodeposition coating process have a cationic functional group such as primary, secondary, tertiary, quarternary and/or amine moiety as a positively chargeable hydrophilic group.

In a preferred embodiment, the resin is an epoxy resin functionalized with amine groups. Preferably, the epoxy resin is prepared from a polyglycidyl ether. Preferably, the polyglycidyl ether of is the polyglycidyl ether of bisphenol A or similar polyphenols. It may also be advantageous to extend the epoxy resin by reacting an excess of epoxide group equivalents with a modifying material, such as a polyol, a polyamine or a polycarboxylic acid, in order to improve the film properties. Preferably, the polyglycidyl ether is extended with bisphenol A. Useful epoxy resins of this kind have a weight average molecular weight, which can be determined by GPC, of from about 3000 to about 6000. Epoxy equivalent weights can range from about 200 to about 2500, and are preferably from about 500 to about 1500.

Amino groups can be incorporated by reacting the polyglycidyl ethers of the polyphenols with amine or polyamines. Typical amines and polyamines include, without limitation, dibutylamine, ethylenediamine, diethylenetriamine, triethylenetetramine, dimethylaminopropylamine, dimethylaminobutylamine, diethylaminopropylamine, diethylaminobutylamine, dipropylamine, and similar compounds, and combinations thereof. In a preferred embodiment, the epoxide groups on the epoxy resin are reacted with a compound comprising a secondary amine group and at least one latent primary amine. The latent primary amine group is preferably a ketimine group. After reaction with the epoxy the primary amines are regenerated, resulting in an amine-capped epoxy resin. Resins used according to the invention preferably have a primary amine equivalent weight of about 300 to about 3000, and more preferably of about 850 to about 1300.

Epoxy-modified novolacs can be used as the resin in the present invention. The epoxy-novolac resin can be capped in the same way as previously described for the epoxy resin.

Acrylic polymers may be made cathodic by incorporation of amino-containing monomers, such as acrylamide, methacrylamide, dimethyl amino ethyl methacrylate or t-butyl amino ethyl methacrylate. Alternatively, epoxy groups may be incorporated by including an epoxy-functional monomer in the polymerization reaction. Such epoxy-functional acrylic polymers may be made cathodic by reaction of the epoxy groups with polyamines according to the methods previously described for the epoxy resins. The molecular weight of a typical acrylic resin is usually in the range from about 2000 to about 50,000, and preferably from about 3000 to about 15,000.

Cationic polyurethanes and polyesters may also be used. Such materials may be prepared by endcapping with, for example, an aminoalcohol or, in the case of the polyurethane, the same compound comprising an amine group that can be salted as previously described may also be useful.

Polybutadiene, polyisoprene, or other epoxy-modified rubber-based polymers can be used as the resin in the present invention. The epoxy-rubber can be capped with a compound comprising an amine group for salting.

In an alternative embodiment, cationic or anionic acrylic resins may be used. In the case of a cationic acrylic resin, the resin is polymerized using N,N'-dimethylaminoethyl methacrylate, tert-butylaminoethyl methacrylate, 2-vinylpyridine, 4-vinylpyridine, vinylpyrrolidine or other such amino monomers. In the case of an anionic acrylic resin, the resin is polymerized using acrylic acid, methacrylic acid, crotonic acid, maleic acid, fumaric acid, crotonic acid, isocrotonic acid, vinylacetic acid, and itaconic acid, anhydrides of these acids, or other suitable acid monomers or anhydride monomers that will generate an acid group for salting. The polymerization also includes a hydroxyl-functional monomer. Useful hydroxyl-functional ethylenically unsaturated monomers include, without limitation, hydroxyethyl methacrylate, hydroxyethyl acrylate, hydroxypropyl acrylate, hydroxypropyl methacrylate, hydroxybutyl acrylate, hydroxybutyl methacrylate, the reaction product of methacrylic acid with styrene oxide, and so on. Preferred hydroxyl monomers are methacrylic or acrylic acid esters in which the hydroxyl-bearing alcohol portion of the compound is a linear or branched hydroxy alkyl moiety having from 1 to about 8 carbon atoms. The monomer bearing the hydroxyl group and the monomer bearing the group for salting (amine for a cationic group or acid or anhydride for anionic group) may be polymerized with one or more other ethylenically unsaturated monomers. Such monomers for copolymerization are known in the art. Illustrative examples include, without limitation, alkyl esters of acrylic or methacrylic acid, e.g., methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate, the corresponding esters of maleic, fumaric, crotonic, isocrotonic, vinylacetic, and itaconic acids, and the like; and vinyl monomers such as styrene, t-butyl styrene, alpha-methyl styrene, vinyl toluene and the like. Other useful polymerizable co-monomers include, for example, alkoxyethyl acrylates and methacrylates, acryloxy acrylates and methacrylates, and compounds such as acrylonitrile, methacrylonitrile, acrolein, and methacrolein. Combinations of these are usually employed.

The amino equivalent weight of the cationic resin can range from about 150 to about 5000, and preferably from about 500 to about 2000. The hydroxyl equivalent weight of the resins, if they have hydroxyl groups, is generally between about 150 and about 2000, and preferably about 200 to about 800.

The electrodeposition coating composition may further contain conventional pigments such as titanium dioxide, ferric oxide, carbon black, aluminum silicate, precipitated barium sulfate, aluminum phosphomolybdate, strontium chromate, basic lead silicate or lead chromate. The pigments may be dispersed using a grind resin or, preferably, a pigment dispersant. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the pigment is 10–40 percent by weight of the nonvolatile material in the bath. Preferably, the pigment is 15 to 30 percent by weight of the nonvolatile material in the bath. Any of the pigments and fillers generally used in electrocoat primers may be included. Extenders such as clay and anti-corrosion pigments are commonly included.

The above components are uniformly dispersed in an aqueous medium. Usually, the principal resin and the crosslinking agent are blended together before the resins are dispersed in the water. In a preferred embodiment, the amine groups of the cathodic electrocoat resins are salted with an acid, such as phosphoric acid, propionic acid, acetic acid, lactic acid, or citric acid. The salting acid may be blended with the resins, mixed with the water, or both, before the resins are added to the water. The acid is used in an amount sufficient to neutralize enough of the amine groups of the principal resin to impart water-dispersibility to the resin. The cationic resin may be fully neutralized; however, partial neutralization is usually sufficient to impart the required water-dispersibility. By "partial neutralization" we mean that at least one, but less than all, of the basic groups on the resin are neutralized. By saying that the cationic resin is at least partially neutralized, we mean that at least one of the basic groups on the resin is neutralized, and up to all of such groups may be neutralized. The degree of neutralization that is required to afford the requisite water-dispersibility for a particular resin will depend upon its chemical composition, molecular weight, and other such factors and can readily be determined by one of ordinary skill in the art through straightforward experimentation.

Similarly, the acid groups of an anionic resin are salted with an amine such as dimethylethanolamine or triethylamine. Again, the salting agent (in this case, an amine) may be blended with the resins, mixed with the water, or both, before the resins are added to the water. The anionic principal resin is at least partially neutralized, but may be fully neutralized as in the case of the cationic resin. At least enough acid groups are salted with the amine to impart water-dispersibility to the resin.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol, monoalkyl ethers of ethylene glycol such as the monomethyl, monoethyl, monopropyl, and monobutyl ethers of ethylene glycol; dialkyl ethers of ethylene glycol such as ethylene glycol dimethyl ether; or diacetone alcohol. A small amount of a water-immiscible organic solvent such as xylene, toluene, methyl isobutyl ketone or 2-ethylhexanol may be added to the mixture of water and the water-miscible organic solvent. The amount of coalescing solvent is not critical and is generally between about 0 to 15 percent by weight, preferably about 0.5 to 5 percent by weight based on total weight of the resin solids.

The electrodeposition coating compositions used in the invention can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such as those available from Air Products and Chemicals under the tradename SURFYNOL®. Surfactants and wetting agents, when present, typically amount to up to 2 percent by weight resin solids. Plasticizers are optionally included to promote flow or modify plating properties. Examples are high boiling water immiscible materials such as ethylene or propylene oxide adducts of nonyl phenols or bisphenol A. Plasticizers can be used at levels of up to 15 percent by weight resin solids.

Curing catalysts such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids.

The electrocoat bath generally has an electroconductivity from 800 micromhos to 6000 micromhos. When conductivity is too low, it is difficult to obtain a film of desired thickness and having desired properties. On the other hand, if the composition is too conductive, problems such as the dissolution of substrate or counter electrode in the bath, uneven film thickness, rupturing of the film, or poor resistance of the film to corrosion or water spotting may result.

The coating composition according to the present invention is electrodeposited onto a substrate and then cured to form a coated article. The electrodeposition of the coating preparations according to the invention may be carried out by any of a number of processes known to those skilled in the art. The electrodeposition coating composition may be applied on any conductive substrate, such as steel, copper, aluminum, or other metals or metal alloys, preferably to a dry film thickness of 10 to 35 $\mu$m. The article coated with the composition of the invention may be a metallic automotive part or body. After application, the coated article is removed from the bath and rinsed with deionized water. The coating may be cured under appropriate conditions, for example by baking at from about 275° F. to about 375° F. for between about 15 and about 60 minutes.

Following electrodeposition, the applied coating is usually cured before other coatings, if used, are applied. When the electrocoat layer is used as a primer in automotive applications, one or more additional coating layers, such as a primer-surfacer, color coat, and, optionally, a clearcoat layer, may be applied over the electrocoat layer. The color coat may be a topcoat enamel. In the automotive industry, the color coat is often a basecoat that is overcoated with a clearcoat layer. The primer surfacer and the topcoat enamel or basecoat and clearcoat composite topcoat may be ether waterborne or solventborne. The coatings can be formulated and applied in a number of different ways known in the art. For example, the resin used can be an acrylic, a polyurethane, or a polyester. Typical topcoat formulations are described in U.S. Pat. Nos. 4,791,168, 4,414,357, 4,546,046, 5,373,069, and 5,474,811. The coatings can be cured by any of the known mechanisms and curing agents, such as a melamine or blocked isocyanate.

The invention is further described in the following example. The example is merely illustrative and does not in any way limit the scope of the invention as described and claimed. All parts are parts by weight unless otherwise noted.

EXAMPLE 1.

Preparation of Crosslinker Having Allophanate Groups

A suitable reactor was charged with 647.6 grams of LUPRANATE MM103 (available from BASF Corporation) and 266.4 grams of LUPRANATE MI (available from BASF Corporation) under a blanket of nitrogen. The mixture was heat to about 45° C., at which time 338.3 grams of ethylene glycol monobutyl ether was added over a period of about 30 minutes. The temperature rose to 60° C. After 30 minutes, 300.0 grams of methyl isobutyl ketone was added, followed by a solution of 0.928 grams of copper acetate monohydrate in 41.49 grams of dimethylethanolamine. Another 24.0 grams of methyl isobutyl ketone was added to rinse the addition funnel. The mixture was heated to 75° C. and then allowed to exotherm to a maximum temperature of 88° C. After about 40 minutes, with the reaction mixture being held at 75° C., about 406 grams of methyl isobutyl ketone were added slowly. The reaction mixture was held at 75° C. until all of the isocyanate functionality was consumed, based on infrared spectroscopy. The resulting product has a nonvolatile content of 65.0% by weight.

EXAMPLE 2.

Preparation of Electrocoat Coating Composition

An electrocoat emulsion was prepared according to the following method. In a suitable container, 658.1 grams of an epoxy solution (greater than 778 weight per epoxide) is cooled from a reaction temperature of 133° C. to a temperature of 100° C. for addition 116.0 grams of a plasticizer mixture (62% nonvolatiles). At 85° C., 35.0 grams of the diketimine of diethylene triamine, 38.8 grams of methylethanolamine, and 10.0 grams of propylene glycol phenyl ether were added. After 35 minutes, the reaction mixture was cooled to 103° C. and reduced to about 79% nonvolatile by weight with 97.1 grams of a mixture of isobutanol and additives. The reaction mixture was then cooled to 91° C. for the addition of 678.0 grams of the crosslinker from Example 1, to produce the final resin mixture at about 74% nonvolatile by weight.

A two-gallon vessel was charged with 747.0 grams of deionized water and 51.6 grams of 88% lactic acid. An amount of about 1590 grams of the final resin mixture was added with good mixing. A total of 1600 additional grams of deionized water were added in portions with good mixing to produce an emulsion with a nonvolatile content of 30% by weight. Organic solvent was stripped from the emulsion and additional deionized water added. The final emulsion had a nonvolatile content of 32.1% by weight. The extent of neutralization was 48%.

The emulsion was then used to prepare an electrocoat coating composition (electrocoat bath). In a separate container, 1633 grams of the final emulsion, 281 grams of a pigment paste (63% by weight nonvolatile, pigment-to-binder=3.3), and 1986 grams of deionized water were mixed together. The electrocoat bath was mixed for 2 hours in an open vessel. The bath had a nonvolatile content of 18% by weight, and pH of 5.8, and a conductivity of 1600 micromhos.

EXAMPLE 3.

Preparation of Crosslinker Having Allophanate Groups

A crosslinker having allophanate groups was prepared as described in Example 1, but the copper acetate monohydrate was replaced on an equivalent basis with zinc acetylacetonate monohydrate.

EXAMPLE 4.

Preparation of Electrocoat Coating Composition

An electrocoat coating composition was prepared according to Example 2, but using the crosslinker of Example 3 in place of the crosslinker of Example 1.

Evaluation of Coating Compositions

The electrocoat coating compositions of Examples 2 and 4 were used to coat 4"×12" steel panels. Panels were coated at 90° F. for 2.2 minutes at 250 volts. The deposited coatings were cured by baking for 20 minutes at 350° F.

The panels coated from the example compositions were evaluated and compared to results using a commercial product, Cathoguard® 310G, available from BASF Corp., having a standard blocked isocyanate crosslinker. The percent weight losses are given in the following table.

|  | Example 2 | Example 4 | Comparative Example |
|---|---|---|---|
| Throwpower, mm | 279 | 279 | 203 |
| Protective throwpower, mm[1] | 278 | 279 | 190 |
| 500 Hour salt spray (mm scribe creep) | 1.40 | 1.49 | 1.23 |
| GM9540P (General Motors 40 cycle corrosion test) (mm scribe creep) | 2.99 | 2.57 | 2.59 |

[1]Measured after 120 hours of salt spray

The invention has been described in detail with reference to preferred embodiments thereof. It should be understood, however, that variations and modifications can be made within the spirit and scope of the invention and of the following claims.

What is claimed is:

1. A process for preparing an allophanate-containing compound, comprising a step of reacting a compound having urethane functionality with a compound having isocyanate functionality in the presence of a metal catalyst and a tertiary amine.

2. A process according to claim 1, wherein the reaction between the compound having urethane functionality and the compound having isocyanate functionality is produced by reacting an excess of equivalent of a polyisocyanate compound with a hydroxyl-functional compound.

3. A process according to claim 2, wherein the polyisocyanate is at least one member selected from the group consisting of isomers of diphenyl methane diisocyanate and mixtures thereof, isocyanurates, biurets, uretdione-containing compounds, carbodiimide-containing compounds, and combinations of these.

4. A process according to claim 2, wherein the hydroxyl-functional compound is at least one member selected from the group consisting of n-butanol, 2-chloroethanol, 2-ethylhexanol, ethylene glycol monoalkyl ethers, propylene glycol monoalkyl ethers, benzyl alcohol, phenol, ethylene glycol polyethylene glycols, propylene glycol, polypropylene glycols, butanediols, trimethylolpropane, pentaerythritol, and alkylene oxide adducts thereof, and combinations thereof.

5. A process for preparing an allophanate-containing compound, comprising a step of reacting:
   (a) a compound having at least one urethane group;
   (b) a compound having at least one isocyanate group;
   (c) a compound comprising at least one hydroxyl group and at least one tertiary amine group; and
   (d) a metal catalyst.

6. A process according to claim 5, wherein compound (c) is included in amount of from about 0.01 to about 0.1 equivalents hydroxyl per equivalent of isocyanate.

7. A process according to claim 5, wherein compound (c) is selected from the group consisting of dimethylethanolamine, diethylaminopentanol, diethylaminopropanol, dimethylaminopropanol, triethanolamine, and combinations thereof.

8. A process according to claim 5, wherein the metal catalyst is copper acetate monohydrate.

9. A process for preparing an allophanate-containing compound, comprising a step of reacting a compound having urethane functionality with a compound having isocyanate functionality in the presence of copper acetate monohydrate.

10. A process according to claim 9, wherein the reaction between the compound having urethane functionality and the compound having isocyanate functionality is produced by reacting an excess of equivalent of a polyisocyanate compound with a hydroxyl-functional compound.

11. A process according to claim 10, wherein the polyisocyanate is at least one member selected from the group consisting of isomers of diphenyl methane diisocyanate and mixtures thereof, isocyanurates, biurets, uretdione-containing compounds, carbodiimide-containing compounds, and combinations of these.

12. A process according to claim 10, wherein the hydroxyl-functional compound is at least one member selected from the group consisting of n-butanol, 2-chloroethanol, 2-ethylhexanol, ethylene glycol monoalkyl ethers, propylene glycol monoalkyl ethers, benzyl alcohol, phenol, ethylene glycol polyethylene glycols, propylene glycol, polypropylene glycols, butanediols, trimethylolpropane, pentaerythritol, and alkylene oxide adducts thereof, and combinations thereof.

13. A process according to claim 1, wherein the metal catalyst is selected from the group consisting of transition metal carboxylates, alcoholates, oxides, phenolates, chelates, and combinations thereof.

14. A process according to claim 1, wherein the metal catalyst is included in an amount of 0.0001 to 0.001 equivalents per equivalent of isocyanate.

15. A process according to claim 1, wherein the metal catalyst is selected from the group consisting of zinc and copper acetylacetonates, copper acetate monohydrate, and combinations thereof.

16. A process according to claim 1, wherein the reaction is stopped at a desired point by adding a member selected from the group consisting of aliphatic and aromatic acid chlorides, perchloric acid, trifluoromethanesulfonic acid, trifluoroacetic acid, chloroformates, and combinations thereof.

* * * * *